United States Patent [19]

Paradis

[11] Patent Number: 4,575,444
[45] Date of Patent: Mar. 11, 1986

[54] FABRICATION OF FLEXIBLE PANEL WITH REINFORCING RIBS

[76] Inventor: Joseph R. Paradis, 60 Plymouth Rd., Holden, Mass. 01520

[21] Appl. No.: 370,556

[22] Filed: Apr. 21, 1982

[51] Int. Cl.⁴ .......................... B29C 17/02; B29D 7/24
[52] U.S. Cl. .................................... 264/291; 264/167; 264/288.8
[58] Field of Search ............ 264/291, 288.8, DIG. 73, 264/292, 288.4, 177 R, DIG. 47, 216, 167, 210.1

[56] References Cited

U.S. PATENT DOCUMENTS

| | | | |
|---|---|---|---|
| 3,137,746 | 6/1964 | Seymour et al. | 264/DIG. 73 |
| 3,574,809 | 12/1968 | Fairbanks et al. | 264/177 R |
| 3,832,267 | 8/1974 | Liu | 264/288.8 |
| 4,101,358 | 7/1978 | Kim et al. | 156/167 |

Primary Examiner—James Lowe
Attorney, Agent, or Firm—George E. Kersey

[57] ABSTRACT

Flexible, reinforced paneling produced by molding a sheet of stretch reorientable plastics material including a plurality of reinforcing ribs and stretching the sheet along one axis to elongate it and simultaneously bring the reinforcing ribs into a reinforcement configuration with respect to the sheet.

8 Claims, 7 Drawing Figures

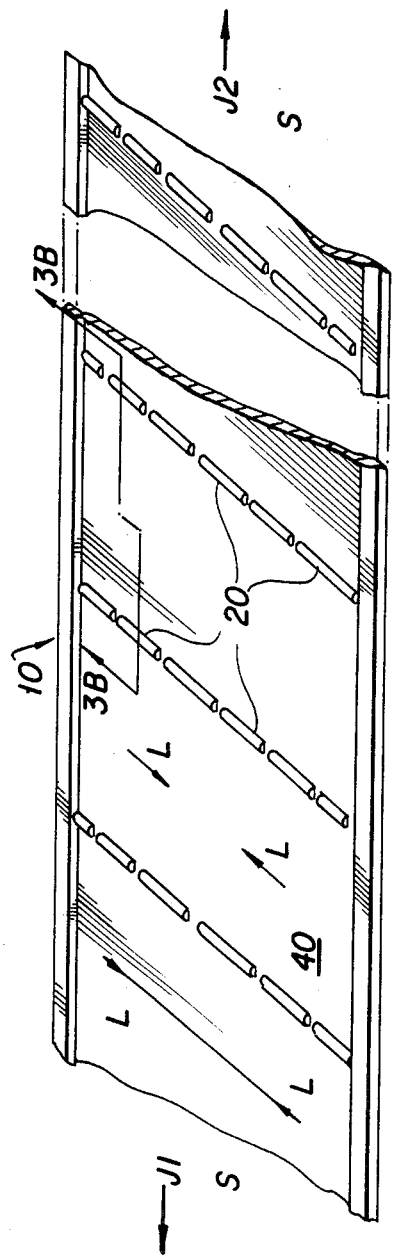
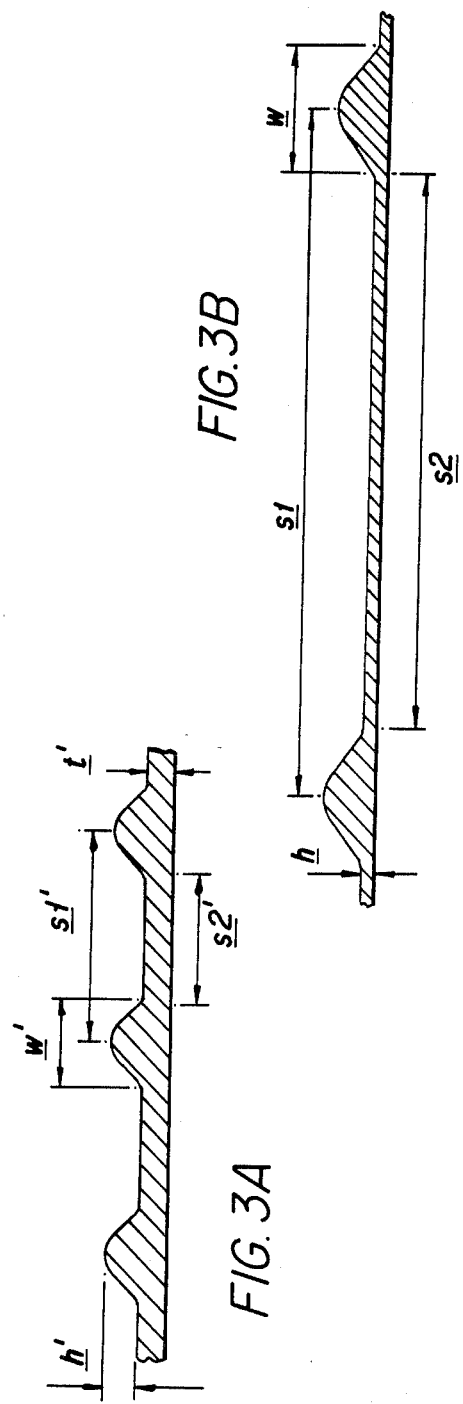

FABRICATION OF FLEXIBLE PANEL WITH REINFORCING RIBS

BACKGROUND OF THE INVENTION

This invention relates to flexible paneling, and, more particularly, to reinforced flexible paneling.

Flexible paneling has a wide variety of uses. It is often employed as a cover for cabinets, particularly for cabinets used in close quarters where access to the cabinet is achieved by sliding the cover, or by elevating it without having the panel leave the confines of the structure with which it is associated. In such a case the paneling must have sufficient flexibility that it can traverse curved contours and adopt the interior configuration of the cabinet. In addition, flexible paneling of this kind requires reinforcement in order to maintain a suitable panel effect when it is in a closed position.

In addition, it is desirable for the paneling to be light and have substantial strength. It has been found that many plastics materials provide suitable reduction in weight, but are difficult to reinforce. One technique is to extrude plastics material into sheeting of prescribed thickness and then apply a reinforcing hinge at spaced intervals on the face of the sheeting by camming the sheeting with steel dies.

The disadvantage of reinforcements produced by hinging and my using die members is that the hinge presents a point of weakness where a rupture typically occurs after the reinforced sheeting has been in appreciable services.

One attempt to overcome the difficulties encountered with impressed panel hinges is to reinforce the panel at the hinge position using additional material. This signficantly complicates the manufacting process without appreciably increasing the wearability of the product. Although panels with reinforced hinges demonstrate additional wearability, the increased wear effect is not commensurate with the complications and added cost associated with that kind of production process.

Accordingly, it is an object of the invention to facilitate the production of flexible, reinforced paneling.

It is another object of the invention to achieve flexible, reinforced paneling that is both light in weight and demonstrates an increase in tensile strength for a prescribed cross-sectional area.

Another object of the invention is to achieve extrudable paneling which does not require hinging or camming in order to become reinforced. A related object is to achieve paneling of greater flexibility, wearability, and strength than can be achieved by the extrusion of panels and their subsequent hinging.

Still another object of the invention is to avoid the need for supplemental reinforcement of flexible paneling produced by extrusion.

A yet further object of the invention is to eliminate the need for external reinforcement of paneling produced by extrusion.

SUMMARY OF THE INVENTION

In accomplishing the foregoing and related objects, the invention provides for the fabrication of flexible reinforced paneling by molding panels from stretch reorientable plastics material with a plurality of reinforcing ribs on at least one surface of the molded panel. The panel, with its integrally molded reinforcement ribs is then stretched along a principal axis of the panel. The stretching of reorientable plastics material achieves an increased tensile strength for a prescribed cross section. The stretching additionally brings about the repositioning of the reinforcing ribs to enhance the reinforcing effect.

In accordance with one aspect of the invention, the reinforcing effect of the molded ribs is enhanced by initially positioning the ribs on the panel so that during stretching the ribs are brought closer together. For that purpose the ribs are desirably molded on the panel in sets of segments that in alignment at desirably a right angle with respect to the axis of stretching or elongation of the panel. As a result, when the panel is stretched the interval between the aligned ribs contracts and the ribs of each linear disposition approach one another, coming into actual contact in the case of suitable stretching along the transverse axis.

In accordance with another aspect of the invention, the reinforcing ribs are located on the face of each panel in a plurality of different rows. The rows of ribs desirably have their members staggered with respect to the adjoining rows in order to enhance the reinforcement effect.

In accordance with yet another aspect of the invention, the panel includes reinforcing edge members disposed at a right angle with respect to the reinforcing ribs. Some of the reinforcing ribs desirably are attached to the reinforcing edge members. In addition, the reinforcing ribs can have different lengths.

DESCRIPTION OF THE DRAWINGS

Other aspects of the invention will become apparent after considering several illustrative embodiments taken in conjunction with the drawings, in which:

FIG. 2B is a perspective view illustrating the elongation of the panel of FIG. 2A by stretching and the lateral contraction that brings the reinforcing bars into desired alignment;

FIG. 3A is a cross-sectional view of a portion of the panel of FIG. 2A before stretching;

FIG. 3B is a cross section of a portion of the panel of FIG. 2B after stretching;

DETAILED DESCRIPTION

Figure 1:
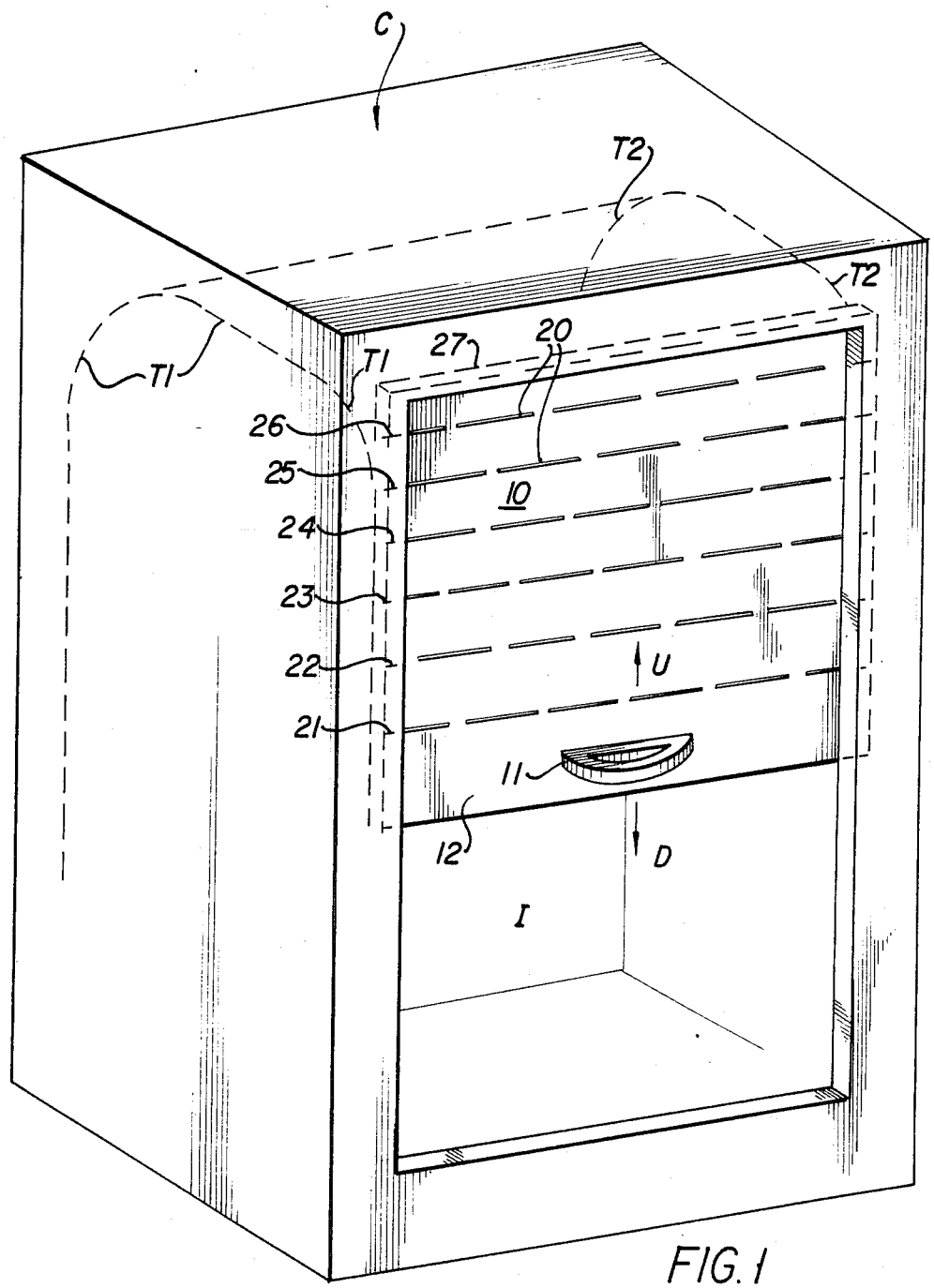
FIG. 1 is a perspective view of a cabinet incorporating a molded door panel produced in accordance with the invention.

With reference to the drawings, FIG. 1 shows an illustrative cabinet C with a door panel 10 produced in accordance with the invention.

The panel 10 of FIG. 1 is shown partially elevated to provide access to the interior I of the cabinet C. The cabinet may be closed by moving the panel downwardly in the direction indicated by the arrow D. Conversely, it may be opened by moving the panel upwardly in the direction indicated by the arrow U. In either case the user grips the lower edge of the panel 10 by an appropriate handle 11.

As the panel is moved upwardly and downwardly, its side edges move along opposed tracks T1 and T2 shown in phantom. In order to accommodate the curvature of the tracks T1 and T2, and still provide a suitably reinforced surface, the panel 10 is produced in a special way.

In particular, the panel 10 includes a relatively planar surface 12 with sets of transverse, segmented ribs 20. The ribs 20 are arranged in successive rows of which only the rows 21 through 27 are visible in FIG. 1. Each row includes a plurality of rib segments, for example, six such segments which are aligned in each row.

To produce the panel 10, a pre-panel 10' is first formed by injection molding. The size of the molding depends upon the final dimensions desired for the panel and the mode of reinforcement, as explained below.

Figure 2A:
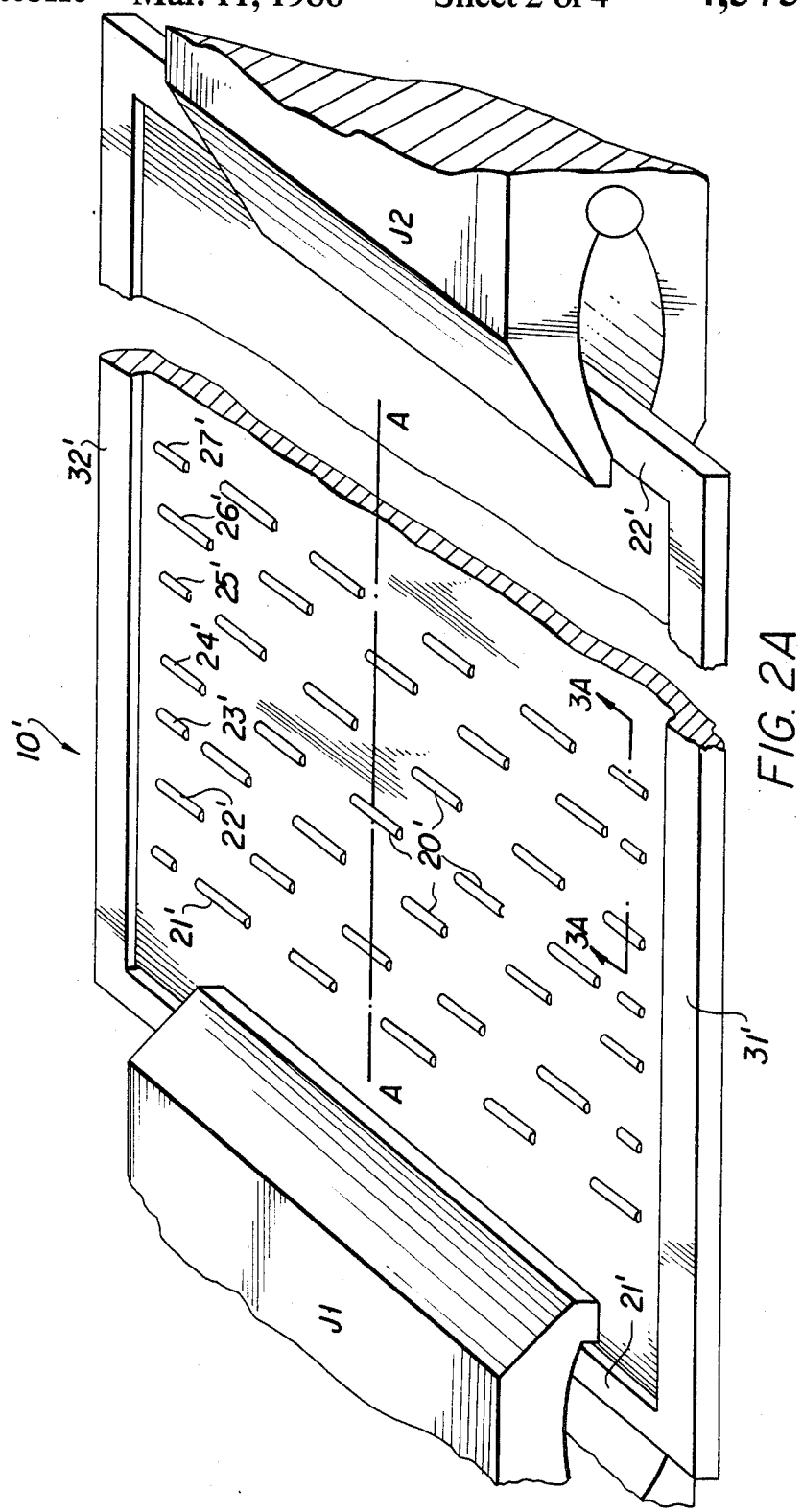
FIG. 2A is a perspective view of the door panel of FIG. 1 after molding preparatory to stretching to increase the cross-sectional tensil strength of the panel and achieve desired reinforcement.

After the molding is produced, using, for example, standard injection molding techniques it is placed between the jaws J1 and J2 of a stretcher as shown in FIG. 2A.

Each of the jaws J1 and J2 forms a closable clamp that is used to grip one longitudinal end of the pre-panel 10'. Each of the opposite longitudinal ends of the pre-panel 10' is desirably provided with lateral abutments 21' and 22' that are gripped upon the closure of the respective jaws J1 and J2.

As can be seen in FIG. 2A the six rib segments of each row have intersegment intervals equal to the average length of each of the segments. It will be appreciated that the intersegment interval may be increased or decreased according to the extent to which subsequent stretching takes place.

The sides of the pre-panel 10' are bounded by reinforcements 31' and 32' which are parallel to the central axis A of the pre-panel 10', and are at a right angle to the alignment of the rib sets 21' through 27'.

In order to accomplish the desired stretching of the pre-panel 10', the jaws J1 and J2 are separated with respect to one another as shown in FIG. 2B and indicated by the double headed arrow S—S. The elongation of the pre-panel 10' causes a lateral contraction indicated by the arrows L—L during the time interval that the panel is being elongated.

As a result of the stretching, only the central portion of the pre-panel 10' adopts the desired configuration for the finally formed panel 10 of FIG. 1.

A partial cross-sectional view of the panel 10 is shown in FIG. 3A. The panel 10 has a basic overall thickness on the order of 0.100 inches. Each rib is approximately, trapezoidal in cross section having an average height on the order of 0.300 inches and a width on the order of 0.200 inches. The rib sections are shown with rounded upper edges but it will be appreciated that they may be molded with linear regions as well.

The molded panel 10 is produced using standard injection molding techniques. A mold with separable parts may be used. In addition, where the panel has appreciable length, it is desirably formed by continuous injection molding on a appropriate molding wheel. Continuous injection molding involves standard use of an injection molding head which is brought into contact with the peripheral surface of the molding wheel containing a die impression in accordance with the structure that is being formed. In the case of the panel 10, the ribs 20 are formed in a depressed die surface of the molding wheel and the lower surface 40 constitutes a layer upon the molding wheel.

Once the molded panel 10 of FIGS. 1 and 2A has been formed, it is either removed from the molding apparatus and separately stretched, or is fed directly to a stretcher. The stretching machine which can be of the convention type produces an elongation of the panel 10 of FIG. 1 along the central axis A with the result shown in FIG. 2A. As a result of the elongation produced by stretching, the interval between adjoining rows of ribs 20 is increased and the width of the panel is decreased. In effect, stretching in accordance with the invention produces an elongation in the direction of stretching and a contraction at a right angle to the direction of stretching. It is this effect that produces the simultaneous strengthening and reinforcing in accordance with the invention.

As can be seen in FIG. 2B the contraction symbolized by the arrows C—C in FIG. 3A cause the segments 30 in each row to approach one another and reduce the intersegment interval to a small fraction of the original interval.

In the case of FIG. 2B the reduction in intersegment interval is on the order of 80 percent of the original interval. The original staggering of the segments in each line, with respect to the segments in each adjoining line, is maintained in FIG. 2B. The effect of stretching on the panel is shown in section in FIG. 3B. The overall thickness of the panel is reduced by 50 percent to approximately 0.050 inches in one illustrative example. The segment width is approximately doubled to about 0.400 inches and the distance between adjoining rows of segments is increased approximately fourfold to about 1.600 inches.

In one example the panel 10 is 20 inches in length before stretching and became 66.6 inches in length after stretching for a stretch ratio of about 3.33.

The materials which are suitable for the practice of the invention include all stretched reorientable plastics, such as nylon and polypropylene.

Figure 4A:
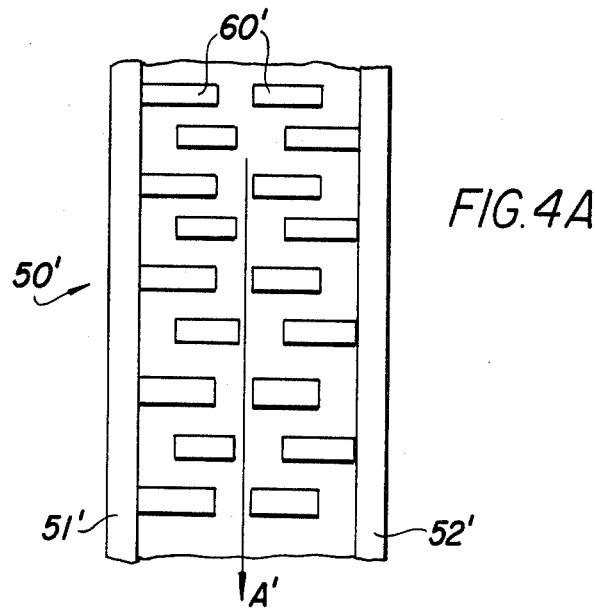
FIG. 4A is an alternative panel molded in accordance with the invention.

An alternative embodiment of the invention is shown in FIG. 4A for a molded panel 50 with reinforcing side edges 51 and 52 and orthogonal reinforcement ribs 60 which are joined to adjacent reinforcement members 51 and 52 and are located in two columns that are staggered relative to one another so that the elements of one column lie between the elements of the opposite column in an axial direction along the central axis A'.

Figure 4B:
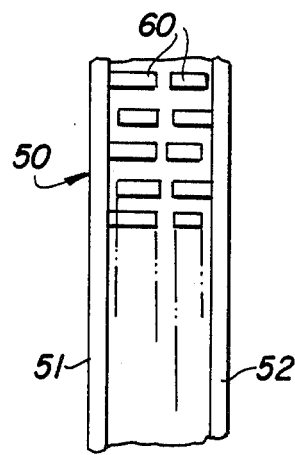
FIG. 4B is a plan view of the panel of FIG. 5A after stretching.

When the molded panel 50 of FIG. 4A is stretched along the central axis A', the result is as shown in FIG. 4B.

While various aspects of the invention have been set forth by the drawings and specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. The method of fabricating a flexible reinforced panel, which comprises the steps of:
(a) molding the panel from a stretch reorientable plastics material with a plurality of segmented ribs thereon in linear alignment; and
(b) stretching the molded panel along only one axis at a right angle to the linear alignment of said segmented ribs to elongate said panel and draw said segmented ribs closer to one another in said linear alignment;
whereby the drawing together of said segmented ribs provides reinforcement for said flexible panel.

2. The method of claim 1 wherein said reinforcing segmented ribs are positioned in a plurality of rows on said panel.

3. The method of claim 2 wherein the segmented ribs of each row are in linear alignment.

4. The method of claim 2 wherein the ribs of each succeeding row are staggered with respect to the segmented ribs of each preceeding row.

5. The method of claim 1 wherein said panel is molded with reinforcing edge members.

6. The method of claim 5 wherein said reinforcing edge members are disposed at a right angle with respect to said reinforcing segmented ribs.

7. The method of claim 6 wherein said reinforcing segmented ribs include members which are attached to said reinforcing edge members.

8. The method of claim 1 wherein said reinforcing segmented ribs have different lengths.

* * * * *